(12) United States Patent
Howarth et al.

(10) Patent No.: US 7,933,084 B2
(45) Date of Patent: Apr. 26, 2011

(54) CORRECTIVE ADJUSTMENT OF RECORDING CHARACTERISTICS IN DIGITAL RENDITIONS OF ANALOG RECORDINGS

(75) Inventors: James R. Howarth, Nantucket, MA (US); Patrick J. Wolfe, Cambridge (GB); Darryl Curley, Oromondo (CA); Timothy Rector, Frederickton (CA)

(73) Assignee: James R. Howarth, Nantucket, MA (US)

( * ) Notice: Subject to any disclaimer, the term of this patent is extended or adjusted under 35 U.S.C. 154(b) by 1723 days.

(21) Appl. No.: 10/530,511

(22) PCT Filed: Oct. 6, 2003

(86) PCT No.: PCT/US03/31771
§ 371 (c)(1), (2), (4) Date: Apr. 6, 2005

(87) PCT Pub. No.: WO2004/034381
PCT Pub. Date: Apr. 22, 2004

(65) Prior Publication Data
US 2006/0001991 A1 Jan. 5, 2006

Related U.S. Application Data

(60) Provisional application No. 60/416,091, filed on Oct. 6, 2002, provisional application No. 60/456,924, filed on Mar. 21, 2003.

(51) Int. Cl.
*G11B 5/02* (2006.01)
(52) U.S. Cl. .............. 360/25; 360/1; 360/8; 360/27; 360/29; 360/32
(58) Field of Classification Search .............. None
See application file for complete search history.

(56) References Cited

U.S. PATENT DOCUMENTS 3,347,997 A * 10/1967 Woodruff .............. 360/27
(Continued)

FOREIGN PATENT DOCUMENTS

GB 1204527 9/1970
(Continued)

OTHER PUBLICATIONS

Bor-Sen Chen, Tsang-Yi Yang, Bin-Hong Lin; Adaptive notch filter by direct frequency estimation; Signal Processing 27; 1992; pp. 161-176; Elsevier Science Publishers; B.V.

(Continued)

*Primary Examiner* — Dismery E Mercedes
(74) *Attorney, Agent, or Firm* — Gerry J. Elman; Elman Technology Law, P.C.

(57) ABSTRACT

A signal reconstruction technique is used to correct for wow and flutter in analog audio recordings. Elements of the recording are used to generate a signal for correcting the output. Involves locating modulated entities such as bias signal (e.g. frequency-modulated, amplitude-modulated, or phase-modulated entities) in the recording, extracting them, and utilizing them as a carrier to synchronize to a master clock, using the irregularity of the anomaly to indicate the speed and pitch information to be corrected. A carrier frequency is determined and applied to a digitized form of the recording. This may be performed even in the absence of a prescribed reference code or tone, such as a pilot tone laid down purposefully at the moment of recording. In the case of signals presumed to have an error in the carrier, a corresponding signal is buffered, and in the case of a presumed error, a last known signal is used for the duration of the error.

9 Claims, 2 Drawing Sheets

U.S. PATENT DOCUMENTS

| | | | |
|---|---|---|---|
| 3,832,045 A | | 8/1974 | Wilson et al. |
| 4,150,395 A | * | 4/1979 | Pritchard ..................... 386/203 |
| 4,353,089 A | * | 10/1982 | Winslow et al. ................ 386/88 |
| 4,481,615 A | * | 11/1984 | Hioki ......................... 369/47.43 |
| 4,535,368 A | * | 8/1985 | Schwartz et al. .............. 360/28 |
| 4,777,541 A | * | 10/1988 | Knowlton ...................... 386/85 |
| 4,802,024 A | * | 1/1989 | Knowlton ...................... 386/88 |
| 5,107,377 A | * | 4/1992 | Ballard ......................... 360/40 |
| 5,189,578 A | * | 2/1993 | Mori et al. ................ 360/294.6 |
| 5,218,486 A | * | 6/1993 | Wilkinson ..................... 360/27 |
| 5,270,666 A | * | 12/1993 | Rapeli et al. .................. 329/341 |
| 5,432,296 A | * | 7/1995 | Takeuchi et al. ............... 84/661 |
| 5,644,307 A | | 7/1997 | Fukuda |
| 5,694,380 A | * | 12/1997 | Shimizume et al. ....... 369/47.45 |
| 5,708,723 A | | 1/1998 | Nishino |
| 5,748,397 A | * | 5/1998 | Yamada .......................... 360/32 |
| 5,818,240 A | * | 10/1998 | Cabot ........................... 324/626 |
| 5,949,606 A | * | 9/1999 | Kaaden et al. ............. 360/77.14 |
| 6,091,822 A | * | 7/2000 | Mellows et al. .............. 380/210 |
| 6,487,028 B1 | * | 11/2002 | Sri-Jayantha et al. .......... 360/25 |
| 6,603,820 B1 | * | 8/2003 | De Mey et al. ................ 375/322 |
| 2004/0207464 A1 | * | 10/2004 | Petrovic et al. ............... 329/315 |

FOREIGN PATENT DOCUMENTS

GB      2012527 A      7/1979

OTHER PUBLICATIONS

Patrick J. Wolfe, Simon J. Godsill; Audio Engineering Society Convention Paper 5829; Mar. 22-25, 2003; Amsterdam, The Netherlands.

* cited by examiner

CORRECTIVE ADJUSTMENT OF RECORDING CHARACTERISTICS IN DIGITAL RENDITIONS OF ANALOG RECORDINGS

TECHNICAL FIELD

This invention provides ways to improve the fidelity of audio recordings. More particularly the invention relates to removing, when the recording is digitized, certain systematic and recurring errors which were generated during an analog recording process.

BACKGROUND ART

Humans function in an "analog" realm; that is, nature is analog. In nature, sound behaves like a sine wave; it has a frequency and amplitude. With respect to signals representing sound, "digital" is the attempt to approximate, to cut down on the complexity caused by the infinite number of states that nature can achieve. The gramophone-type vinyl records play back sound that was taken as a continuous signal, with an infinite number of values. So too with analog audio tape recordings. On the other hand, electronically readable media including optical disks such as CDs and DVDs; digital audio tape; and memory cards such as Secure Digital and Memory Stick, store digital representations of sound that has been sampled at discrete intervals, usually on the order of nanoseconds. CDs and the other such media are "digital" in that, at the lowest level, everything is represented as either a zero or a one. The time slices at which the samples are taken are so small that it is impossible to recognize when listening that a certain amount of information from the continuous "analog" realm of nature has been omitted. On the other hand, this zero-one (binary) implementation makes the signal representing the music much easier to manipulate.

In addition, one of the great advantages of a digital recording is that it is highly stable with regard to timing, since, unlike analog recordings which rely on electromechanical devices to maintain their speed and pitch accuracy, digital recordings are limited only by the resolution of the master clock oscillator driving all the computation, which typically is a quartz device with precision typically within parts per million.

In many instances, analog recordings are digitized, to create a second master recording in a digital format, either because in the most obvious case the original recording was analog, and a transfer to CD or DVD or other digital medium is desired. There are also those who are familiar with the mechanical razor blade editing of tape or film or who prefer the particular way the analog processing affects the sound of the recording. In any event at some point for mass commercial release it must be converted to a digital medium. The digital medium is used to make the optical disk (e.g. CD or DVD).

Recordings which are made with analog techniques are invariably subject to timing errors, such as wow and flutter (hereinafter sometimes "wow/flutter" for short), resulting from speed variations in tape travel and other errors which degrade the quality of the sound. Fluctuations of one or two per second are generally classified as "wow," while faster variations are called "flutter." Even longer term variations than "wow" are sometimes termed "drift" but would be included within the compass of "wow/flutter" as used herein.

Some workers in the field have sought to mitigate those variations and errors in various particular ways.

U.S. Pat. No. 4,535,368 to Schwartz and Wu, describes apparatus for correcting instantaneous frequency deviation in the output signal of a playback device. The apparatus described comprises means for providing a constant-frequency signal at the output of the playback device in addition to the normal recorded program material to be reproduced by the playback device. The apparatus further includes a frequency-to-voltage converter having an input coupled to the playback device, which receives the constant-frequency signal, and produces an output voltage proportional to the frequency of the input signal; and a voltage-averaging means receiving the frequency-to-voltage converter output, which averages the input signal over a predetermined time period and produces an output signal representing the constant-frequency signal as originally provided. The output of the frequency-to-voltage converter and the output of the voltage-averaging means are both fed to a means for comparing these outputs, which produces an output voltage proportional to the frequency of a control signal required to correct the instantaneous frequency deviations in the output of the playback device. The output of the aforesaid comparing means is fed to a voltage-to-frequency converter, which produced a first control signal. A delay device receives the output of the playback device. The delay device has a clock drive that is driven by a control signal of variable frequency and coupled to the output of first voltage-to-frequency converter. The intended result is that the signals representing the normal recorded program material as reproduced by the playback device are selectively delayed by a time proportional to the frequency of the first control signal to thereby substantially correct for the detected instantaneous frequency deviations in the playback device's output.

U.S. Pat. No. 5,748,397, to Yamada, describes an audio-signal-processing apparatus and recording and/or reproducing apparatus for a tape-shaped recording medium. The reproducing apparatus includes a recording and/or reproducing head, a detecting section, and a compensating section. The reproducing head records or reproduces from analog signals and a detecting section detects any fluctuation in the transporting speed with respect to a rated transporting speed. The compensating section modifies analog signals, read from or to be recorded on tape by the tape head, so as to compensate for any fluctuation in the transport speed of the tape during recording or reproduction. The fluctuation in the transport speed on the basis of detection results from the detecting section before these analog signals are output or supplied to the recording and/or reproducing head. The audio signal processing apparatus includes a clock pulse generating section, an A/D-converting section, a computing section, and a signal generating section. The A/D-converting section converts input analog signals into digital signals in accordance with clock pulses from the clock pulse generating section. The computing section computes any fluctuation in the transporting speed of a tape with respect to a reference transporting speed on the basis of the results of the detection of the actual transporting speed of the tape. The signal-generating section converts the digital signals from the A/D-converting section into analog signals in which any fluctuation in the transporting speed of the tape with respect to the reference transporting speed has been compensated for on the basis of detection results from the computing section, and outputs the analog signals thus generated.

The audio-signal-processing apparatus can alternatively include a computing section, and first and second sample-and-hold sections. The computing section computes any fluctuation in the transporting speed of a tape with respect to a reference transporting speed on the basis of the results of the detection of the actual transporting speed of the tape. The first sample-and-hold section performs a sample-and-hold operation in a first cycle on inputted analog signals. The second sample-and-hold section performs a sample-and-hold operation in a second cycle on the output from the first sample-and-hold section. The second cycle is produced to compensate the first cycle according to the computing result from the computing section. Input/output timing of analog signals is controlled to vary in accordance with the results of the detection of the transporting speed of the tape. This reduces wow/flutter due to fluctuations in the transporting speed of the tape from the reproducing signals or the signals recorded on the recording medium. It is noted that Yamada teaches a speed system which is reliant upon mechanical correction using a tachometer device and is limited by the resolution of the tachometer, as is the case of any mechanically based system. It is also unable to deal with any problems that arise due to improper storage of tape or other physical medium, such as tape stretch or edge ruffle.

Neither of the aforementioned systems is directed to correcting adverse effects on recordings made on other equipment. Although some recordings incorporate a pilot tone or other time markings laid down purposefully on a companion track on the tape at the moment of recording, e.g. pursuant to standards promulgated by the Society of Motion Picture and Television Engineers, and such as are incorporated in audio recorders available from Nagravision S A (Cheseau, Switzerland), a need exists for a method and apparatus to correct wow/flutter in existing audio recordings that do not incorporate purposeful time markings.

Many beloved recordings exist that sound quite good by today's standards, but all of them are afflicted to some extent with speed variations brought about by the mechanical device employed to move the medium at the moment of recording. It would be highly desirable if a method were available by which the higher timing accuracy of digital recording could be employed to somehow refurbish the older analog recordings such that they could maintain a technical footing in this era.

DISCLOSURE OF INVENTION

The present invention provides a means to, in effect, look back in time to the original mechanical performance of the machinery, and translate that analysis into a speed and pitch correction using the mathematical techniques of present day audio. This translates into a listening experience much more in line with the beneficial aspects of modern digital audio, even if the tape were 50 years old.

It would be desirable to correct these speed variations and to correct the corresponding tonal or frequency shifts in the recordings. The present invention provides improved means to remove errors which were generated during an analog recording process.

While the term "tape" is used herein interchangeably with "medium," understand that the invention is not limited to any particular recording or storage medium. Of course, there are particular signal characteristics which tend to be associated with particular recording technologies and their corresponding media Indeed, these peculiarities are utilized to advantage in the forensic aspect of the method of the present invention.

Analog recordings often include artifacts from the original recording, which are not intended by the artist, producer, or engineer to be part of the performance. In the case of magnetic media such as tape, the tape is placed in a condition for recording by a bias signal. The bias signal is generally of a fixed ultrasonic frequency for any given recording device. The bias signal is sometimes referred to as a "birdie" because, at slow playback speeds, the sound is audibly detectable as a whistle with a definite musical pitch, which is an indication of its periodicity. In accordance with the present invention, any "timing" embedded in the bias signal can be used as a reference signal. In addition, artifacts internal to the recording, such as certain noises associated with radio transmission, background mechanical sounds and motor bearing rumble, may be found in a recording.

According to the present invention, one or more elements of the recording itself are used to generate a signal for correcting the frequency and speed of a recording containing wow and/or flutter (herein sometimes "wow/flutter"). The present invention provides for forensically locating modulated entities (e.g. frequency-modulated, amplitude-modulated, or phase-modulated entities) in the recording, extracting those entities from the recording, and utilizing them to synchronize to a master clock, using the irregularity of the anomaly to indicate the speed and pitch information to be corrected in the recording. It is an advantage of the invention that this process may be performed even in the absence of a prescribed reference code or tone, such as a pilot tone laid down purposefully at the moment of recording.

In one aspect of the present invention, a speed-stabilized audio reproduction is ultimately derived from analog recordings. In a first step, a wideband analog playback signal is received from an analog recording. A signal corresponding to a bias signal from the analog recording is obtained and used to establish a synchronization reference for the analog recording. The signal corresponding to the bias signal is stabilized, and the stabilized signal is used to conform a synchronization of the wideband playback signal in digital form to the synchronization reference for the analog recording. This results in adjustment of the speed of the recording, which adjusted signal can be recaptured in digital form.

In accordance with a further aspect of the invention, deviations in the wideband analog playback signal are deduced by sensing changes in the reference signal. The sound frequencies in the analog to digital conversion, preserved in the digital recording are adjusted in accordance with the deduced deviations.

According to a further aspect of the invention, a reference sound element is extracted as a reference signal from elements within the recording itself, absent a prescribed code or tone. The reference sound element is derived from a wideband analog playback signal and may be a periodic frequency-modulated, amplitude-modulated, or phase-modulated entity within the recording itself rather than on an auxiliary track. A determination is made of the deviation between the reference sound element and a pre-established sound pattern for the reference sound element, and sound frequencies and rate of change of the digital format are adjusted in accordance with the deduced deviation.

According to a further aspect of the invention, the extracted reference signal representing a reference sound element is shaped and made continuous, and therefore a carrier wave is produced, the carrier being ultimately derived from the wideband analog playback signal without reference to a prescribed tone or code or an auxiliary track accompanying the recording track(s) being corrected. A deviation between the carrier and a high-precision clock is determined, and the wideband playback signal is adjusted in a digital format according to this deviation.

According to a further aspect of the invention, limits in the rate of change within a period of the reference signal are established. If the deviation during a period exceeds these limits, the synchronization of the digitized wideband playback signal is derived from the reference signal occurring before and after this event.

While "bias" is exemplified herein, it is to be understood that various other reference signals may alternatively be used to fulfill the promise of this invention. The principal requirement is that the system deduce a reference signal present in the recording, which was either captured during or imposed upon the recording, generally at the time it was first made. Thus, for example, for a recording made on wax in which a 60-Hz hum is detectable, the 60-Hz hum can be used as the reference signal for purposes of the present invention. Such a signal may in general be any entity that is frequency-modulated, amplitude-modulated or phase-modulated that can be detected, i.e. discovered, in the recording utilizing any and all forensic methods which may be applied in accordance with the present invention.

An aspect of the present invention involves making use of the fixed high frequency bias tone that was recorded on tape simultaneously with the audio, which recording is by its nature imperfect with regard to speed. What was once a fixed frequency will now be coming off tape as FM, and the frequency modulation will be a mirror image of the original speed variations, and that modulation is used to re-time the analog-to-digital ("A/D") conversion or post-process the timing of the digitized audio.

One method to do this is to subtly but firmly modulate the digitizing clock. This is not the same as introducing jitter, since it occurs at such relatively low frequencies. Rather it is analogous to applying a low frequency oscillation ("LFO") to the input or output of the A/D converter and in so doing creating an automatic pitch shifter. The pitch shifter is driven by the original pitch error, and the error becomes self-cancelling. The aggregate speed variations of the original recording and its playback will be nulled out. Another method to implement the invention is a standalone software solution or a workstation plug-in that achieves these results in software by modulating the digitized audio with a guide tone derived from a digital sample of the bias, the plug-in being analogous to Auto-Tune (Antares Audio Technologies, Scotts Valley, Calif.), with an added sidechain input.

Thus, the present invention involves a method of providing an improved audio reproduction derived from an analog recording. Such a method comprises: generating a wideband analog playback signal from an analog recording containing at least one recorded soundtrack, the analog recording being absent a prescribed code or prescribed tone indicative of timing; converting the wideband analog playback signal to a digitized wideband playback signal; deriving a reference signal from either the analog or digitized wideband playback signal, the reference signal being synchronous with the wideband playback signal; generating a carrier by stabilizing the reference signal; sensing periodic deviations between the carrier and a high-precision clock; and adjusting timing and pitch in the digitized wideband playback signal in response to the deduced periodic deviations, thereby producing a wideband playback signal substantially corrected for unintended frequency modulation. <CLAIM 1>

In one aspect the invention may be implemented via a dedicated hardware system, an example of which is disclosed below. In another aspect the analog input is digitized, and the invention is implemented via a general-purpose computer controlled by software programmed to process digital data as is also disclosed below.

In one aspect of the invention, the reference signal is generated by identifying a reference sound entity which can be derived from within the wideband analog playback signal; and a carrier is generated with a knowable pattern by which to deduce the deviation from the fixed clock.

In another aspect of the invention, the aforesaid method further comprises determining a set of data reflecting the instantaneous deviation between a nominal intermediate frequency and the reference signal; and generating a carrier that reflects the deviations so determined.

In yet another aspect, a method of the invention further comprises establishing a limit in a change in a period of the reference signal, and if the change in the period exceeds the limit, separately conforming the synchronization of the digitized wideband playback signal to the stabilized carrier at a time of the recording which occurs after the change, thereby separately adjusting the synchronization before and after the change.

In another aspect, the reference signal is derived from a bias signal present in the wideband analog playback signal.

MODES FOR CARRYING OUT THE INVENTION

A. Overall System

Figure 1:
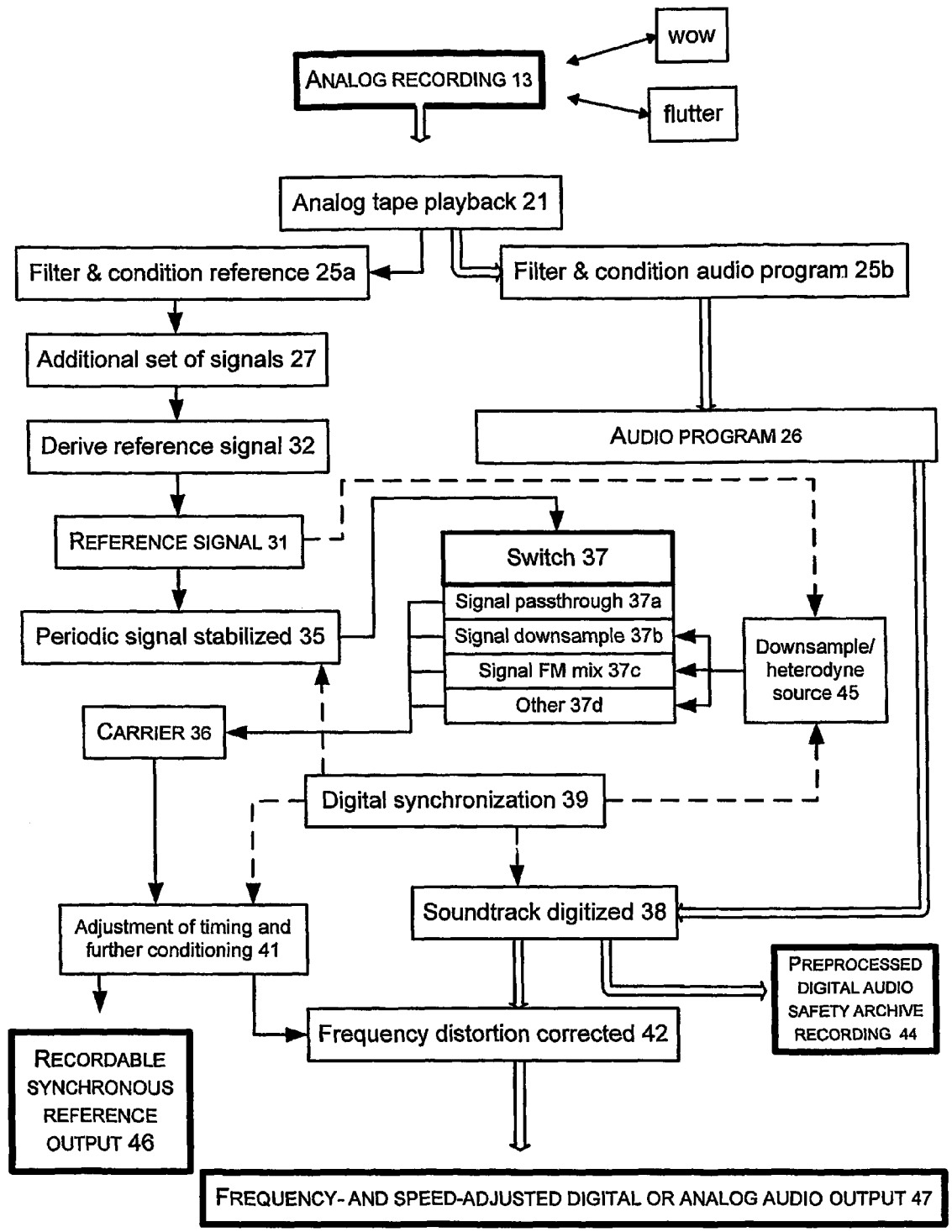
FIG. 1 is a block diagram showing an overall view of an implementation of the present invention.

FIG. 1 is a block diagram showing an overall view of an implementation of the present invention. It is to be understood that this diagram shows steps and apparatus which may be performed in carrying out a particular embodiment thereof. Other steps and apparatus may alternatively be adopted in performing the invention, for example, processing a digital signal entirely via software.

A user of the invention begins with an analog recording 13, for example, a tape recording, that exhibits frequency modulation which may be characterized as wow/flutter. The analog recording may include one or more tracks, e.g. for stereophonic or surround sound. The wow/flutter is present because the recording process was subject to mechanical variations which affect the speed of tape or other recording medium past a recording element, e.g. tape head. One aspect of the invention takes advantage of the fact that the bias and record signals typically go hand in hand, and thus are subject to the same instantaneous frequency modulation on playback.

The analog recording 13 typically contains a bias signal at a frequency considered to be outside the audible hearing range, typically from somewhat below 30 kHz to upwards of 1.5 MHz, and to the extent that it affects an audio track, the bias signal is typically filtered on playback. Conventionally the bias signal has been ignored as being irrelevant to the quality of the recording.

In FIG. 1, the transfer of wideband audio signal, e.g. from an audio program represented by one or more recorded tracks on tape or other medium, is indicated by double-lined arrows. Additional signals generated in accordance with the invention are also indicated.

As indicated at block 21, the analog tape (or other) recording is played back, using a high quality playback system. The output of the analog tape playback 21 is provided to two or more channels. One channel, beginning at block 25a, provides a carrier 36 which is used to adjust timing. The other channel, beginning at block 25b, is for the signal(s) representing the wideband audio program.

The analog recording 13 may typically be a mixed recording having any conventional number of audio tracks, or alternatively it may be one or more tracks of an original recording that were laid down in a particular instance.

From a technical point of view, it is easiest to remove wow/flutter by using references in the original recording. When the source recordings are not considered to be the "original" of the recorded performance, and the user must make judgments as to the extent that the source recording will be altered in accordance with artifacts detected therein. There are instances where the user may choose to retain certain distortions and other "errors" in the source recording, i.e. when the frequency modulation was intentionally inculcated into the recording as a "vibrato" effect.

The present invention may be employed with respect to selected tracks, i.e. individual components of a mix, where desired and where possible.

In most situations it will be desirable to make corrections to the output of a mixed master (a secondary recording) because of additional production effects added to the mixed master that are not present in the original recording. It obviously is not possible to use the bias reference signal from the earlier session master because its bias does not pass onto any subsequent generation. However where material within the program can be isolated by, for example spectrum analysis and filtration, i.e. bass guitar, such identical elements within the mixed master can be compared with the same elements in the session master and the mixed master can then be time-varied to remove to a degree the imperfections present in the session master.

Still referring to FIG. 1, a reference signal 31 is derived at block 32 from the signal generated from audio tape playback 21. This signal may be derived from the mixed recording or selected track(s), by first filtering and conditioning the reference at block 25a, optionally extracting one or more additional sets of signals 27 from filtered and conditioned audio program 25b, and then deriving a reference signal at block 32.

In the case of bias signals, the prominent bias signal will be that impressed upon the magnetic media being played. Alternatively, any other detectable periodic signal such as bearing rumble or background noise can be used in accordance with alternative aspects of the invention. There are also certain signals generated by radio-frequency sections of the equipment which can be used as references. The reference signal is preferably processed via a channel that is separate from the channel used for the actual wideband recording of the soundtrack (that, is the channel of block 25b). Although a bias signal is primarily described herein, the user should understand that the reference signal may be any signal that may be derived as aforesaid from an analog recording. Remember too that the source recording may be on a medium other than tape, even an old wax cylinder.

The bias signal or other periodic signal extracted as described above is then used as a reference signal 31 for timing of digital recording of the soundtrack. In order to do this most effectively, the periodic signal is desirably stabilized as shown at block 35. This can be performed by software or electronically, as by a phase locked loop. The dashed line from the digital synchronization block 39 to block 35 represents this relationship. Thus if a bias signal has dropouts, the stabilization 35 provides a periodic continuity of the bias signal.

The stabilized signal from block 35 is then fed to a switch 37, at which any of four options may be selected. In the first option, signal passthrough 37a, the signal is passed through without change. In the second option, signal downsample 37b, the signal is resampled at a different rate, for example by a function provided by downsample/heterodyne source ("D/HS") 45. In the third option, signal FM mixer 37c, the signal is heterodyned with an FM source provided by D/HS 45. In the fourth option, other 37d, the signal is processed, e.g. employing another signal generated by D/HS 45, for example, in response to input from digital synchronization 39.

The output of switch 37 is identified herein as the carrier 36. The carrier 36 is a modified form of the reference signal 31 that is used to control adjustment of timing and further conditioning 41 as applied at block 42 to the digitized version of the soundtrack generated at block 38.

Stabilization of the audio program 26 is desirably achieved by a bias tracking circuit or bias tracker at block 25b. The bias tracking circuit may comprise an analog front end ("AFE"), a processor for tracking the bias, and a modulation function circuit ("DDS"). (See DDS 206 in FIG. 2.) In the case of digital processing, the processor for tracking may use a tracking algorithm or a digital phase locked loop ("PLL"). In analog processing this can be done by a conventional signal stabilization circuit, such as a PLL.

In an example of the invention, the components may function as follows:

Signal generated by analog tape playback 21 may be filtered and conditioned at block 25b, first by passing it through an 8th order low pass filter with cutoff around 38 kHz. Signal is then passed through an automatic gain control ("AGC") stage to keep it at about the full dynamic range of the analog-to-digital converter ("ADC").

Signal is then passed through a 4th order high pass filter with cutoff about 400 kHz. High pass filter comes after AGC to prevent AGC-generated harmonics from aliasing in the ADC stage. The signal is then sampled at some sampling frequency. The sampling frequency is restrained to lie between 80 and 120 kHz. The frequency is selected by the DSP such that the alias of the 'nominal' bias signal always lies at about Fs/4, where Fs is the frequency of sampling. This is done in order to have maximum dynamic range for FM variations in the bias.

The resulting audio program 26 is then fed to block 38 at which the soundtrack is digitized. The timing of the digitized soundtrack 38 is established by digital synchronization 39. Desirably the output of soundtrack digitized block 38 is stored as a preprocessed digital audio safety recording 44. At block 42, wow/flutter frequency distortion is corrected in accordance with the present invention.

An optional but particularly advantageous feature of the invention is that the digitization may be backtracked to repair the discontinuity caused by a splice or other abrupt change in the recording medium. This can be accomplished by buffering the signal to allow time for correction or by other techniques which allow for re-computation and revised correction to occur. For example, whenever the change in the reference signal 31 exceeds a predetermined limit, it is presumed that this represents either a splice in the original recording or possibly a combination of a splice and a change in the type of recording. If such a change occurs, the synchronization is not matched across the splice. Such a change in the reference signal 31 is likely to occur with a time-shifted delay across channels, especially if the change is across a diagonal splice. Correction may be applied by computing a new carrier 36 based on a new sampling of the reference signal 31 after the splice. This can be applied by computing the new carrier 36 based on a very short sampling of the analog recording after the splice. The new carrier 36 is compared to the corresponding reference signal 31 to define each instantaneous adjustment of timing applied at block 41 to the section of the digitized soundtrack generated at block 38 following the splice. This is done by shifting the D/HS 45 such that the nominal carrier frequency remains the same even though the reference signal 31 has changed.

The synchronization signal varies according to the particular sampling rate used for digital recording. Typically 96 KHz is used for DVDA (DVD Association), and 192 KHz is used by ProTools (Digidesign, Inc., Daly City, Calif.). Advantageously, the synchronization would be computed to land at one of the standard frequencies (e.g. via word clock output).

As shown in block 41, adjustment of timing and further conditioning of the carrier signal is provided. Such processing may include, for example, baseband processing, single sideband, etc.

In accordance with the invention, where there is a deduced change in speed, there will be a corresponding frequency distortion in the original analog recording. This frequency distortion in the digitized soundtrack 38 is corrected at block 42 by an amount indicated by the adjustment of timing and further conditioning 41. The adjustment is determined from a carrier 36 which is obtained as aforesaid from the original recording or from a source recording. The carrier 36 can be derived from any particular sound or signal on the medium which is deemed to be more dependable than the original recording speed.

The carrier 36 is used to modulate the adjustment in timing 41 and the corresponding correction of frequency distortion 42. The product of this correction is a frequency- and speed-adjusted digital or analog audio output 47.

Optionally, a user may choose to save a recordable synchronous reference output 46 from block 41, as an "undo" backup or for possible further processing, e.g. if an even more effective methodology is devised in the future. Similarly a preprocessed digital audio safety archive recording 44 may be generated for this purpose.

In addition to tape bias, other reference signals 27 can be used to generate the reference signal 31. Examples would be noise generated by bearing rumble or other mechanical phenomena, completely external noise incorporated into a recording, such as air-conditioner rumble or AC hum, or another periodic signal. This is significant because a bias signal is not always available. A forensic determination is made as to the timing significance of the detected signal, and this signal is used as a reference signal to an extent justified by the timing significance.

It is also possible to use other encoded signals at block 27. For example, the SMPTE (Society of Motion Picture and Television Engineers) timecode is provided on many original recordings. In one embodiment, the SMPTE timecode provides a standardized signal encoded into the recording for synchronization purposes. This standardized signal consists of signal components in a predetermined pattern, so individual components can be detected at a rate which exceeds the total time period of the SMPTE timecode. Since this is a known pattern, it is possible to predict the timing of these signal components, and therefore the internal components of the signal can be used as a time standard which can be used as a reference signal. In that case, reference signal 31 is derived at the bit level by using the pattern embedded in the entire SMPTE timecode to derive the reference signal. The reference signal derived from the SMPTE timecode is therefore considered to be generated at a microtiming level.

B. Bias Frequency Tracking System Hardware Design

1. Introduction

Figure 2:
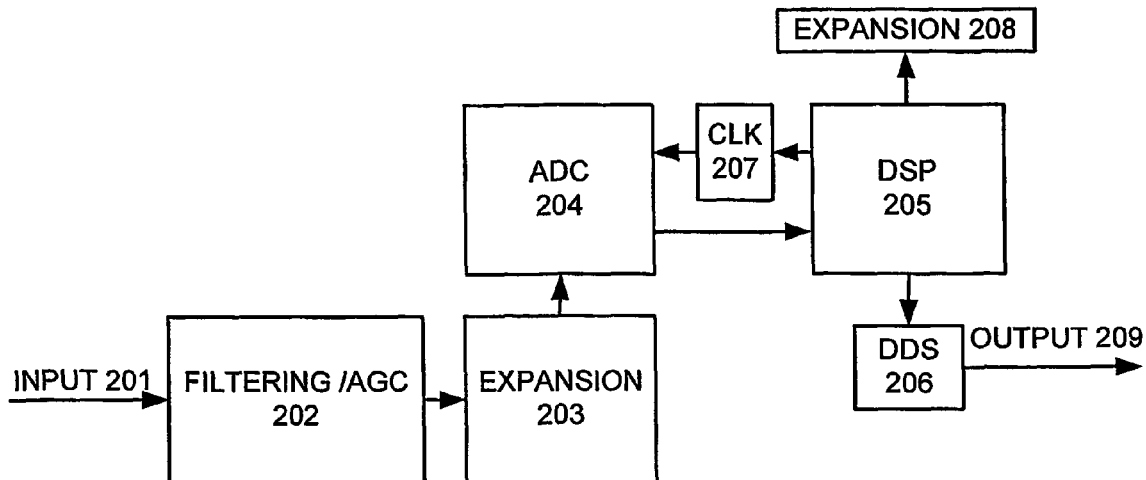
FIG. 2 is a block diagram of a frequency-tracking system which may be used in the present invention.

This section describes the hardware shown in FIG. 2 for a frequency tracking system that will track the frequency of the bias signal recovered from tape recordings. This is an example of how such a system may be implemented but it will be apparent to those skilled in the art that alternative configurations of equipment will perform similar functions as herein disclosed.

Typically the frequency to be tracked ranges, e.g., from below 30 kHz to 1.5 MHz or higher, and more typically from 40 kHz to 470 kHz. The system uses the tracking information to modulate a sinusoidal tone, a clock, or directly communicates with the subsequent software, such that the original frequency deviations are recreated proportionally in these output signals. The hardware may optionally output both these signals. Either signal may be used in an embodiment of the invention.

The actual frequency tracking is done using an adaptive notch filter implemented in the DSP 205. Savings in time and cost can be achieved by under-sampling the input frequency. Since the signal is narrow band, this strategy makes sense. Simulations have shown no discernable performance increase when the input signal is sampled at 2 MHz rather than under sampling at 100 kHz. (Simulations used a 120 kHz input frequency.) The ADSP-21060 of Analog Devices, Inc., Norwood, Mass., has been employed as the DSP in an implementation of the invention. An analysis of the basic frequency tracking algorithm shows that about 200 cycles are required. At 100 kHz the ADSP-21060 will have 400 cycles so there is room for future expansion 208 as required.

The hardware can be described in functional units as shown in FIG. 2. These functions are covered in the following sections, which describe a preferred embodiment of this component of the invention.

2. Filtering and AGC

The system can accept either a differential or single-ended signal. The signal is AC coupled to a difference amplifier which feeds an 8th order elliptical high pass filter, which eliminates any audio present in the signal. The cutoff frequency is selected as 38 kHz, which is 5% lower than the minimum expected bias frequency of 40 kHz in this embodiment (though some bias frequencies may be encountered that are below 30 kHz) The signal is then passed through a 4th order Chebychev low pass filter to eliminate out-of-band noise. The cutoff frequency is 500 kHz, about 5% higher than the highest expected bias frequency of 480 kHz in this embodiment (though some bias frequencies may be encountered that are above 1.5 MHz). An AGC circuit 202 consisting of a peak detector and a voltage controlled amplifier ("VCA") then keep the average peak amplitude of the signal at a constant value to guard against variations in signal strength. The AGC, together with a fixed gain stage following it, ensure that the full dynamic range of the ADC is being used at all input signal levels. The AGC control voltage is monitored by a comparator. Since this voltage is an indication of input signal strength, the comparator can be used to signal the DSP that the input signal has been lost. This could aid in implementing the "freewheeling" behavior desired of the system in the absence of a valid input signal. Connectors are desirably included to make convenient any additional analog circuitry that may be needed. An example of this would be a programmable narrow-band filter (e.g. ±3% of input signal frequency) in case the input signal is so distorted that large errors are created in the tracking algorithm.

3. ADC

An ADC 204 which may be used in the present invention is the AD7671 (Analog Devices, Inc.). This is a 1 MSPS successive approximation ADC. Its sampling rate is under control of the DSP 205 so that an appropriate sampling frequency can be selected by software. The system will initially determine the actual frequency and then set an appropriate under sampling frequency so that the (aliased) input signal frequency is between 0.1 Fs and 0.4 Fs. This frequency is preferably about 100 kHz.

4. Modulation Function Circuit (DDS)

In this embodiment of the invention, a direct digital synthesizer ("DDS") 206 provides modulation functions. The DDS is a numerically controlled oscillator tied to a sine look-up table and a digital-analog converter ("DAC") so that it outputs a sinusoid. The algorithm applies a proportional correction to the output center frequency (e.g. 15840) and then calculates the digital word necessary to set the DDS output frequency to this value. The value is sent out and the DDS output frequency is changed. Thus the frequency of the DDS output is modulated about the output center frequency in proportion to the FM variation in the original bias signal. The DDS output is put through a 2nd order low pass filter cutoff about 30 kHz to provide some rejection of spurs and noise and is then buffered to an output connector.

The DDS creates the output tone. It has a frequency resolution of about 0.1 Hz so about 10 ppm (16 bits) resolution is possible at a nominal 10 kHz output tone frequency. Higher resolution can be achieved by lowering the DDS input clock. The output of the DDS is filtered and then AC coupled to the system output. The created audio tone is over-sampled by a factor of 1000 so the output filter need not be more than first order. A high-speed comparator is placed at the DDS audio tone output so that a square wave clock can be produced as well. In this case the nominal frequency of the tone would be increased to 44.1 kHz or 96 kHz. One input of the comparator receives a heavily filtered version of the output so that the other input, the unaltered signal, is compared to its own mean. This ensures a 50% duty cycle clock.

5. DSP

The DSP 205 employed in the present embodiment has been laid out with the possibility of future expansion 208 and rapid prototyping in mind. Many of the signals are brought out to headers to interface with external circuits or systems. Because the two major peripherals are serial devices, there are no memory-mapped devices (except a boot EEPROM), which simplifies PCB routing. The DSP has 4 flags, 2 interrupts and the high speed serial port which can be used as simple control or communication lines to/from an external host systems. The DSP exemplified here (ADSP-21060) has enough internal data memory to allow a buffer of at least 0.1 seconds at a sampling rate of 100 kHz, adequate for implementing smooth transitions to and from "free wheeling" conditions under loss of valid input signal.

C. Software Implementation

The reconstruction of signals, including reconstruction of nonuniformly sampled audio signals can follow mathematical interpretation. According to the present invention, signal processing is used for the playback-rate correction of nonuniformly sampled audio waveforms, where it is assumed that an accurate measurement of the timing irregularities in the original recording is available. The following describes the underlying mathematical problem and provides a framework for its solution via software implemented on a general-purpose computer, e.g. a microcomputer with a well-known operating system such as Windows, Linux or Unix. From the following discussion, its software implementation will be readily feasible by those skilled in programming for systems processing digital representations of audio signals.

Consider a single-channel digital audio waveform whose individual samples are denoted x[n] for a given sample number n. Under ordinary circumstances, we assume that this discrete time signal is defined in terms of an underlying continuous signal x(t) which has been sampled at a regular interval T, leading to a sampled representation in which x[n] is defined as x(nT), the n-th regularly spaced sample of x(t). Indeed, the goal of most sampling schemes is, wherever possible, to sample the analog signal of interest at a regular rate Fs sufficiently high to ensure a perfect reconstruction principle in theory. Analysis and subsequent signal processing is almost always predicated on this requirement; however, implicit in this assumption is that the actual recording or sampling mechanism was operating at a fixed rate. In effect, the sampling operation comprises a time-invariant system.

Due to mechanical variations and other causes, this assumption may be invalidated for a number of reasons. This is described in P. E. Axon and H. Davies, "A study of frequency fluctuations in sound recording and reproduction systems," Proceedings of the IEEE, Part III, p. 65, 1945. It is often possible to characterize the nature of such variations, examples of which include "wow" and "flutter," and indeed these often exhibit a regular structure which depends on the underlying mechanics or electronics of the hardware employed in the recording process. As audio material is often recorded for archival or distribution purposes, any small variations in the timing of the original transduction will reappear at playback as a time-varying global pitch-shifting effect. The task at hand is thus to reconstruct the audio signal in such a way that the pitch effects induced by the timing variations are removed.

The present invention is desirably implemented with signals whi have already been converted to digital format. Therefore, the present interpretation of the mathematical problem shall be expressed purely in the digital domain. To this end, consider a discrete time signal x[n] whose samples suffer from timing variations. The samples can be characterized as corresponding to n=1, 2, 3, . . . no longer appear at regular intervals nTs of the nominal sampling period Ts=1/Fs, but rather at some irregular intervals such that the time of the n-th sample is given by its nominal time nTs plus an offset n due to some timing-variation mechanism.

Viewed in this manner, the required mathematical task is hence one of reconstructing a nonuniformly sampled signal. For example, if a mechanical timing variation was regular and periodic such as that which characterizes wow/flutter effects, we would expect a repeating sequence of n's. If, on the other hand, a timing variation were the result of an analog tape machine running at a constant, but slightly-below-nominal speed, we would expect the sequence of n's to increase in magnitude as the true sample time diverges to a greater and greater extent from the nominal sample timing nTs.

It is noted that in this purely discrete-time interpretation, no distinction is made between the original (potentially) analog recording and a subsequent analog-to-digital conversion. Another way to view this problem, in terms of the continuous time axis rather than an irregular sampling problem, is achieved by S. J. Godsill and P. J. W. Rayner, "The restoration of pitch variation defects in gramophone recordings," in Proceedings of the IEEE Workshop on Applications of Signal Processing to Audio and Acoustics, 1993. Working in the analog domain, the signal of interest x(t) is assumed to have been replaced by a version x(f(t)), where f(t) denotes a warping function acting on the time axis t. In this case the goal of any reconstruction algorithm is to determine f−1 (t), the inverse of the time-warping function, so as to be able to recover x(t) from x(f(t)). In this interpretation, it is implicitly assumed that the given samples x[n] occur at a regular interval, whereas it is the timing of the underlying waveform itself that has been distorted.

The foregoing approaches are nevertheless mathematically equivalent, provided that the original, underlying continuous time signal x(t) is band limited, and both approaches focus on the reconstruction of this underlying signal. According to the present invention, the end goal will in fact be to resample the reconstructed signal at a regular interval corresponding to the desired sample rate, for subsequent storage or processing in digital form. Therefore, the first approach is preferred, without recourse to an analog signal reconstruction or indeed an underlying analog model of events.

Additionally, let us assume that we are able by some means to obtain an accurate measurement of the timing irregularities in the original recording. For example, a perfectly sinusoidal tone on the original recording, if distinct from the spectrum of the audio material contained therein, will act as an FM carrier for the speed variations in the recording mechanism. In this case, the timing-variation information pertaining to the original recording will be recoverable simply via demodulation of the FM carrier. The present invention obtains an approximation of such a measurement.

The Shannon sampling theorem for reconstructing a continuous signal x(t) from its regular samples x(nT) is as follows:

$$x(t) = \sum_{n=-\infty}^{\infty} x(nT) \mathrm{sinc}\left(\frac{1}{T}(t-nT)\right). \quad \text{Equation (1)}$$

Effectively, Equation (1) states the value of the waveform at an arbitrary time t is a function of its entire (doubly-infinite) regularly spaced sampled version, in which the samples x[n] =x(nT) are weighted according to the sinc function:

$$\mathrm{sinc}(x) = \begin{cases} 1 & \text{if } x=0 \\ \dfrac{\sin \pi x}{\pi x} & \text{otherwise,} \end{cases} \quad \text{Equation (2)}$$

A similar formula holds for discrete periodic signals, as described in T. Schanze, "Sinc interpolation of discrete periodic signals," IEEE Transactions on Signal Processing, vol. 43, no. 6, pp. 1502-1503, 1995. In the case at hand, however, the reconstruction formula of Equation (1) is modified to account for irregular sampling. There are ways to accomplish such an interpolation procedure without recourse to Equation (1) directly, however, as an illuminating example illustrated here, the method of bandlimited interpolation uses a windowed sinc function, which simulations have shown to be effective in practice. It is noted that the formula of Equation (1) reduces to a single sample only when t=nT for any integer n; otherwise, the output is an infinite sum of all samples, each of which is weighted by a delayed version of the sinc function corresponding to the fractional sample delay t/T, since $$\frac{1}{T}(t-nT) = \frac{t}{T} - n. \quad \text{Equation (3)}$$

In this manner one may consider the reconstruction problem to be related to time-varying sample rate conversion, which in turn is linked to the problems of static sample-rate conversion and fractional delay filter design. Examples of fractional delay filter designs are found at T. I. Laakso, V. V alim aki, M. Karjalainen, and U. K. Laine, "Splitting the unit delay-tools for fractional delay filter design," IEEE Signal Processing Magazine, vol. 13, pp. 30-60, January 1996, and at W. Putnam and J. O. Smith, "Design of fractional delay filters using convex optimization," in Proceedings of the IEEE Workshop on Applications of Signal Processing to Audio and Acoustics, 1997.

A reconstruction formula depending on an infinite number of samples, as suggested by Equation (1), is of no immediate value in practice, and suggests the need for a more practical method. From Equation (2) we see that the weights decrease rapidly as the distance from the origin increases, suggesting that an approximation may be obtained by truncating the infinite series of Equation (1), for example to the nearest 2M+1 samples. Doing so leads to the following expression for a sample centered around the origin and delayed by an amount $-T<\tau_n<T$:

$$x(\tau_n) = \sum_{m=-M}^{M} x[m] \,\mathrm{sinc}\left(\frac{\tau_n}{T} - m\right). \quad \text{Equation (4)}$$

where here we employ the discrete-time index m to emphasize that the n-th delayed signal value $x(\tau_n)$, is a function of its nearest 2M+1 neighbors. In the task at hand, for example, appropriate values of $\tau_n$ may be determined from the sample offsets $\Delta_n$ described above.

This reconstruction method is equivalent to approximating the impulse response of an ideal low-pass filter by truncating it, and indeed provides a means of time-varying sample rate conversion if it is assumed that the 2M+1 nearest neighbors to a desired output $x(\tau_n)$ have been sampled at the same rate. In fact, it can be shown that to ensure bandlimitedness in this case the sinc weighting must be modified slightly to the form $\gamma \,\mathrm{sinc}(\gamma(\tau_n/T-m))$, with $\gamma$ given by the minimum of unity and the sampling-rate conversion factor. Such a formulation may be shown to be optimal in a least-squares sense; however, in practice the sinc function is often multiplied by a smooth window function which tapers to zeros at a distance of M samples from the origin in order to flatten the response of the low-pass filter pass band.

Therefore, the task of reconstructing a recorded audio signal subject to timing variations may be posed in a more general sense as a problem of bandlimited interpolation, which lends itself to Shannon sampling theory. This also makes it possible to interpolate between irregularly sampled data points.

In practice, simulations indicate that the magnitude of mathematical error resulting from a reconstruction using spline interpolation schemes and the windowed sinc method is similar. The reconstruction is considered to generate little distortion. If the measured time delay is zero, then the output signal will be identical to the input signal—as shown explicitly above for the case of windowed sinc interpolation.

Figure 3:
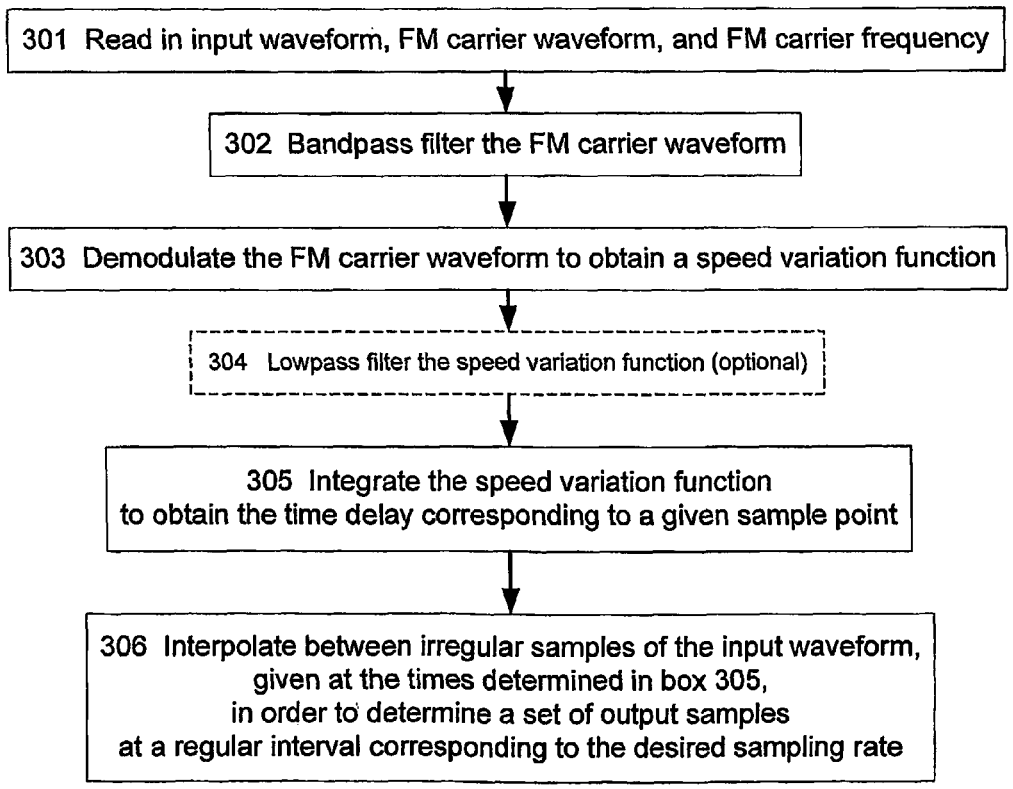
FIG. 3 is a block diagram of a software module which may be used in an implementation of the present invention.

Pseudocode for a signal reconstruction algorithm along these lines is depicted in FIG. 3. An input waveform is read (Step 301). This includes reading in the input waveform, reading in the FM carrier waveform, and reading in the FM carrier frequency. The FM carrier waveform is passed through a bandpass filter (Step 302). This can be executed by various techniques, such as by using a linear-phase finite-impulse-response digital filter. This step is optional and can be performed before or after the input waveform is read in Step 301. The FM carrier waveform is demodulated to obtain a speed variation function (Step 303). This can be done using either hardware or software methods. The speed variation function is then subject to a lowpass filter (Step 304). This operation is optional and can also be performed with a linear-phase finite-impulse response digital filter or any other convenient filtering technique. The speed variation function is then integrated (Step 305). This provides a time delay corresponding to a given sample point n. This can be done in any convenient way, for example by using numerical quadrature. An interpolation is made between irregular samples of the input waveform (Step 306), given at the times determined by the integrated time delay. The interpolation is made in order to determine a set of output samples at a regular interval corresponding to the desired sampling rate. This can be done, for example, by using splines, a truncated sinc function, or any other local or global interpolation method.

Such digital audio data may also be processed using complex wavelets, as described in P. J. Wolfe and S. J. Godsill, "Audio signal processing using complex wavelets," Audio Engineering Society Convention Paper 5829, Amsterdam, Mar. 22-25, 2003.

INDUSTRIAL APPLICABILITY

The present invention provides a means for resurrecting the best recordings of the past with greater fidelity to the original performance than had originally been captured. It also provides a means for improving the quality of recordings made with consumer-grade tape recorders and the like, for broadcasting, archiving, or other forms of audio processing such as speech-recognition and identity confirmation. The products of the methods described herein, including such products as optical disks, (e.g. CD audio recordings and DVDs having audio channels enhanced as disclosed herein), digital audio tapes; and memory storage cards or other devices such as Secure Digital or Memory Stick cards and the like having data stored therein in compressed digital audio formats such as MP3 that have been processed in accordance herewith, are also contemplated by and part of the present invention Such products may be packaged for consumer purchase with artwork and text identifying the source of the audio programming, e.g. the performers and the contents of the tracks, In that event, they may contain a statement that the original recording (which was in analog form) has been digitally remastered or enhanced. The invention also contemplates delivery of content produced in accordance herewith as digital audio streams via the Internet, e.g. such as by RealOne, or by digital broadcast.

It is to be appreciated that although the present invention has been described with respect to particular embodiments, variations in implementation will be apparent from the present disclosure to those skilled in the field and are contemplated herein, with intent to be protected within the scope of the appended claims pursuant to patent law.

The invention claimed is:

1. A method of providing an improved audio reproduction derived from an analog recording, the method comprising:
digitizing a wideband playback signal from an analog recording containing wow/flutter;
deriving, without use of a prescribed tone or time-code previously applied and intended to be indicative of timing, a reference signal from within the digitized wideband playback signal, the reference signal being an extraneous artifact within the recording;
generating a modulated carrier by at least one of stabilizing, idealizing, and demodulating the reference signal;
deducing deviations between the modulated carrier and a high-precision clock signal or sampling rate
adjusting timing and pitch in the digitized wideband playback signal in response to the deduced deviations, wherein such adjusting comprises establishing a change in a period of the reference signal, then conforming the timing and pitch of the digitized wideband playback signal to the modulated carrier
thereby producing a wideband playback signal substantially corrected for distortion corresponding to said wow/flutter.

2. The method of claim 1, wherein the reference signal is generated by identifying a reference sound entity which can be derived from the analog recording; and wherein the modulated carrier is generated from a known or preestablished pattern within the reference sound entity.

3. The method of claim 1, further comprising: determining a set of data reflecting at least one instantaneous deviation between a nominal intermediate frequency and the reference signal; and generating a modulated carrier that reflects the at least one instantaneous deviation.

4. The method of claim 1, wherein the reference signal is derived from a bias signal present in the analog recording.

5. The method of claim 1, further comprising:
extracting a reference sound element which can be derived from the analog recording;
determining a deviation between a high-precision clock signal or sampling rate and a pre-established sound pattern for the reference sound element; and
adjusting sound frequencies and timing in the digital domain in accordance with the deviation.

6. The method of claim 1, further comprising:
extracting an existing carrier which can be derived from the analog recording;
determining a deviation between a high-precision clock signal or sampling rate and a corresponding representation of the carrier within the analog recording; and
adjusting the digitized wideband playback signal according to the deviation.

7. An electronically readable storage medium, other than a transitory signal, containing data representing digital audio information which has been generated by the method of claim 1.

8. The electronically readable storage medium of claim 7, wherein the medium is an optical disk, a memory card, or a digital audio tape cassette.

9. The electronically readable storage medium of claim 8, further comprising packaging displaying artwork and text which identifies the source of the digital audio information and includes a statement to the effect that the original recording has been digitally remastered or digitally enhanced.

* * * * *